US012391326B2

(12) United States Patent
Savoie et al.

(10) Patent No.: US 12,391,326 B2
(45) Date of Patent: Aug. 19, 2025

(54) VEHICLE WITH A WINDSHIELD ASSEMBLY

(71) Applicant: BOMBARDIER RECREATIONAL PRODUCTS INC., Valcourt (CA)

(72) Inventors: Felix Savoie, Sherbrooke (CA); Remi Larrouy, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/490,215

(22) Filed: Oct. 19, 2023

(65) Prior Publication Data

US 2024/0140550 A1 May 2, 2024

Related U.S. Application Data

(60) Provisional application No. 63/420,135, filed on Oct. 28, 2022.

(51) Int. Cl.
 *B62J 17/04* (2006.01)
 *B62J 7/06* (2006.01)
 *B62K 5/01* (2013.01)

(52) U.S. Cl.
 CPC .............. *B62J 17/04* (2013.01); *B62J 7/06* (2013.01); *B62K 5/01* (2013.01)

(58) Field of Classification Search
 CPC ... B62J 17/04; B62J 7/06; B62J 17/02; B62K 5/01
 See application file for complete search history.

(56) References Cited

U.S. PATENT DOCUMENTS

| 4,606,571 | A  | * | 8/1986 | Fujita ....................... | B62J 17/04 |
|---|---|---|---|---|---|
|  |  |  |  |  | 296/89 |
| 2002/0074820 | A1 | * | 6/2002 | Gagne ........................ | B60J 1/04 |
|  |  |  |  |  | 296/78.1 |
| 2009/0146447 | A1 | * | 6/2009 | Baretta ....................... | B60J 1/04 |
|  |  |  |  |  | 296/96.21 |

(Continued)

FOREIGN PATENT DOCUMENTS

| DE |       3700761 A1 | * | 7/1987 |            |
|----|------------------|---|--------|------------|
| DE | 102020126146 B4  | * | 7/2024 | B62J 17/04 |

(Continued)

*Primary Examiner* — Drew J Brown
(74) *Attorney, Agent, or Firm* — BCF LLP

(57) ABSTRACT

A vehicle comprising: a frame; a driver seat connected to the frame; a handlebar disposed forward of the driver seat, the handlebar rotatable about a steering column axis; a storage rack connected to the frame, the storage rack being disposed forward of the handlebar; a windshield support connected to the frame, the windshield support being disposed forward of the handlebar and rearward of the rack; and a windshield connected to the windshield support, the handlebar rotating relative to the windshield. A method of mounting the windshield to the vehicle, the method comprising: selecting the windshield support from first and second windshield supports, the second windshield support being taller than the first windshield support; connecting the selected windshield support to the frame of the vehicle forward of the driver seat and between the handlebar and the front storage rack; and connecting the windshield to the selected windshield support.

15 Claims, 16 Drawing Sheets

(56) References Cited

U.S. PATENT DOCUMENTS

| | | | | |
|---|---|---|---|---|
| 2014/0136076 | A1* | 5/2014 | Novak | B62J 17/02 |
| | | | | 701/99 |
| 2021/0107584 | A1* | 4/2021 | Sawada | B62J 17/04 |
| 2022/0055709 | A1* | 2/2022 | Tamura | B62J 50/225 |
| 2023/0339560 | A1* | 10/2023 | Tsai | B62J 17/04 |

FOREIGN PATENT DOCUMENTS

| | | | | | |
|---|---|---|---|---|---|
| EP | 1958858 | A2 | * | 8/2008 | B62J 17/02 |
| EP | 2923927 | A1 | * | 9/2015 | B62J 17/04 |
| ES | 2362189 | T3 | * | 6/2011 | B62J 17/04 |
| ES | 2592414 | T3 | * | 11/2016 | B62J 17/04 |
| IT | 202000025822 | A1 | * | 4/2022 | |
| JP | H0752857 | A | * | 2/1995 | |
| JP | 2023035571 | A | * | 3/2023 | B29C 45/14631 |
| TW | 200404701 | A | * | 4/2004 | |
| TW | 200918397 | A | * | 5/2009 | B62J 17/04 |
| WO | WO-2021105967 | A2 | * | 6/2021 | B62K 11/14 |

* cited by examiner

VEHICLE WITH A WINDSHIELD ASSEMBLY

REFERENCE TO RELATED APPLICATION

The present application claims priority to U.S. Provisional Patent Application No. 63/420,135, filed Oct. 28, 2022, the entirety of which is incorporated herein by reference.

TECHNOLOGICAL FIELD

The present technology relates to vehicles with a windshield assembly.

BACKGROUND

Recreational vehicles such as personal watercrafts (PWCs), all-terrain vehicles (ATVs), side-by-side off-road vehicles (SSVs), snowmobiles and the like are used for both utility and recreational purposes. Some such vehicles have a windshield which is connected to a frame of the vehicle and is independent of a handlebar. However, fixing the windshield to a part of the body of the vehicle may result in a reduction of space of storage and/or accessories.

Therefore, there is a desire for windshield assemblies for recreational vehicles that are independent of the handlebar and do not result in a significant reduction of storage space.

SUMMARY

It is an object of the present technology to ameliorate at least some of the inconveniences present in the prior art.

In one aspect, the present technology provides vehicle comprising: a frame; a driver seat connected to the frame; a handlebar disposed forward of the driver seat, the handlebar rotatable about a steering column axis; a storage rack connected to the frame, the storage rack being disposed forward of the handlebar; a windshield support connected to the frame, the windshield support being disposed forward of the handlebar and rearward of the rack; and a windshield connected to the windshield support, the handlebar rotating relative to the windshield.

In some implementations, the windshield support extends upwardly from the frame.

In some implementations, the windshield support comprises: a central portion which is connected to the frame and extends upwardly from the frame, a left wing portion extending forwardly from a left side of the central portion and connected to the windshield at a left region of the windshield; and a right wing portion extending forwardly from a right side of the central portion and connected to the windshield at a right region of the windshield.

In some implementations, each of the left wing portion and the right wing portion has a distal surface which abuts the windshield and extends upwardly along the respective left and right regions of the windshield.

In some implementations, each of the left wing portion and the right wing portion have one or more wing openings formed therein.

In some implementations, the windshield defines windshield apertures, each of the windshield apertures being configured to receive a fastener therethrough for engagement with a corresponding windshield support aperture in the windshield support.

In some implementations, the windshield apertures comprise a lower set of windshield apertures and an upper set of windshield apertures.

In some implementations, the windshield apertures are configured such that the windshield can be connected to the windshield support at a first height from the frame or at a second height from the frame, the first and second heights being different.

In some implementations, the vehicle further comprises a cover connected to the windshield on a forward side of the windshield, the cover covering at least some of the windshield apertures.

In some implementations, the windshield support is connected to and supported by a panel which is connected to the frame.

In some implementations, the windshield support is a primary windshield support, the vehicle further comprising a secondary windshield support connected to the frame, and the primary windshield support is connected to and supported by the secondary windshield support.

In some implementations, the secondary windshield support comprises a storage compartment.

In some implementations, the storage compartment has a front wall and a door, the door being rearward of the front wall, and the primary windshield support is mounted to the front wall of the storage compartment.

In some implementations, the vehicle further comprises a left wind deflector and a right wind deflector connected to a left side and a right side, respectively, of the storage compartment.

In some implementations, the vehicle further comprises a left wind deflector and a right wind deflector connected to the frame at a left side and a right side, respectively, of the windshield.

In some implementations, a lower edge of the windshield is lower than an upper edge of the left wind deflector and an upper edge of the right wind deflector.

In some implementations, a lower edge of the left wind deflector and a lower edge the right wind deflector windshield is lower than a lower edge of the windshield.

In some implementations, the vehicle further comprises a cargo box attached to the storage rack, the cargo box being forward of the windshield and having a lid.

In some implementations, the vehicle is an all-terrain vehicle; the driver seat is a straddle-type seat; and the vehicle comprises: a motor supported by the frame; and four wheels connected to the frame, at least two of the four wheels being operatively connected to and driven by the motor.

From another aspect, there is provided a method of mounting a windshield to a vehicle, the method comprising: selecting a windshield support from a first windshield support and a second windshield support, the second windshield support being taller than the first windshield support; connecting the selected windshield support to a frame of the vehicle at a position forward of a driver seat of the vehicle and between a handlebar of the vehicle and a front storage rack of the vehicle; and connecting the windshield to the selected windshield support.

In some implementations, connecting the windshield to the selected windshield support comprises: inserting a pair of fasteners through one of a first pair of windshield apertures and a second pair of windshield apertures defined in the windshield; and inserting the pair of fasteners in a pair of windshield support apertures defined in the selected windshield support; the windshield is at a first height relative to the frame when the pair of fasteners is inserted through the first pair of windshield apertures; the windshield is at a second height relative to the frame when the pair of fasteners is inserted through the second pair of windshield apertures; and the second height is greater than the first height.

For purposes of the present application, terms related to spatial orientation when referring to a vehicle and components in relation to the vehicle, such as "forwardly", "rearwardly", "left", "right", "top", "bottom", "upper", "lower" "above" and "below", are as they would be understood by a driver of the vehicle sitting thereon in an upright driving position, with the vehicle steered straight-ahead.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

In the following description, an implementation of a windshield assembly 200 for a vehicle 10 will be described. The windshield assembly 200 that will be described herein is for a straddle-seat all-terrain vehicle 10 (hereinafter ATV) and is of a fixed-type, meaning that it is of a type wherein the windshield is independent of a handlebar of the ATV and does not move with the handlebar. It is contemplated that aspects of the windshield assembly 200 of the present technology could be used in other types of vehicles, such as three-wheeled vehicles, personal watercrafts (PWCs), motorcycles, and the like.

Figure 1:
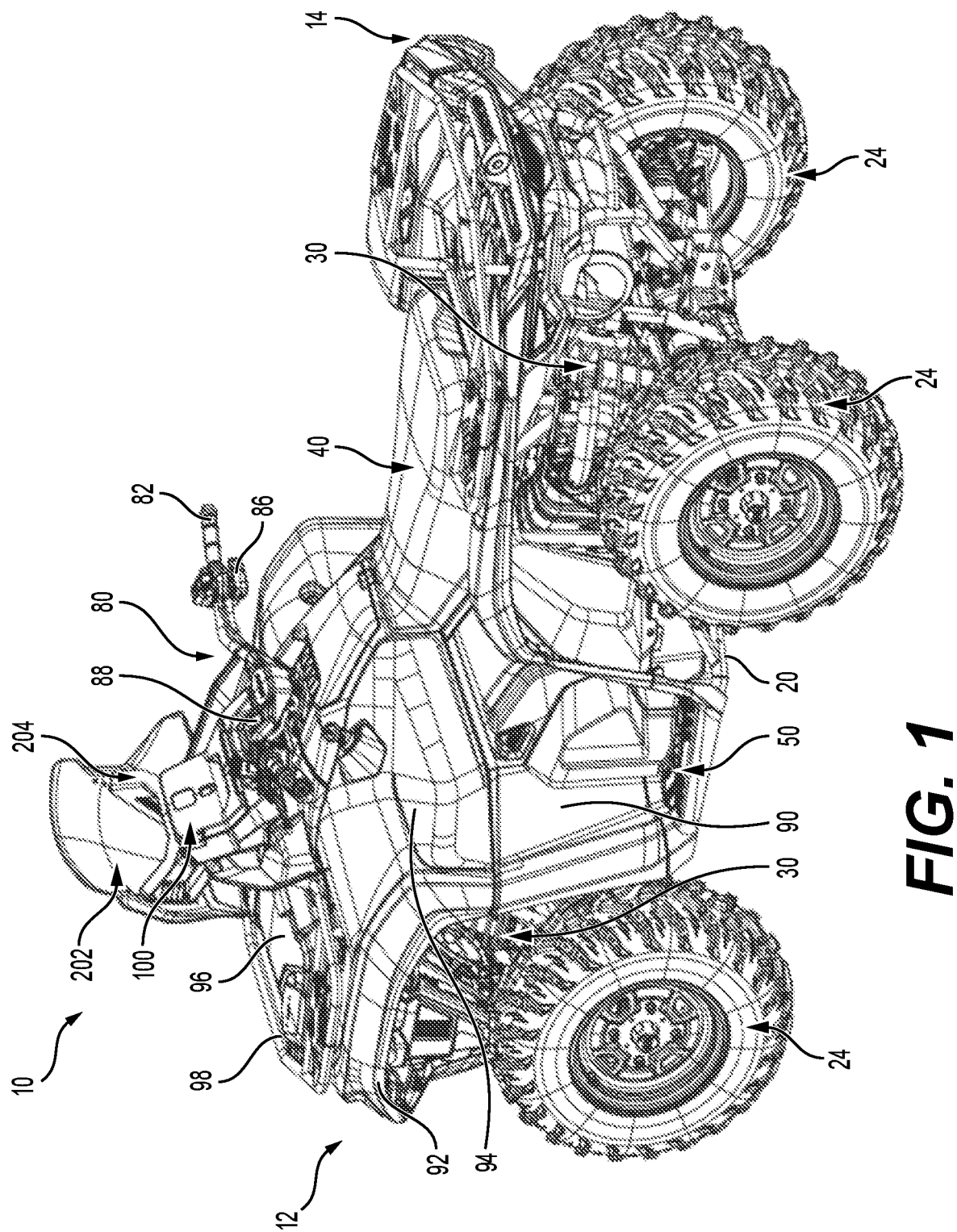
FIG. 1 is a perspective view taken from a top, back, left side of a straddle-seat all-terrain vehicle (ATV), with a windshield assembly secured thereto.
Figure 2:
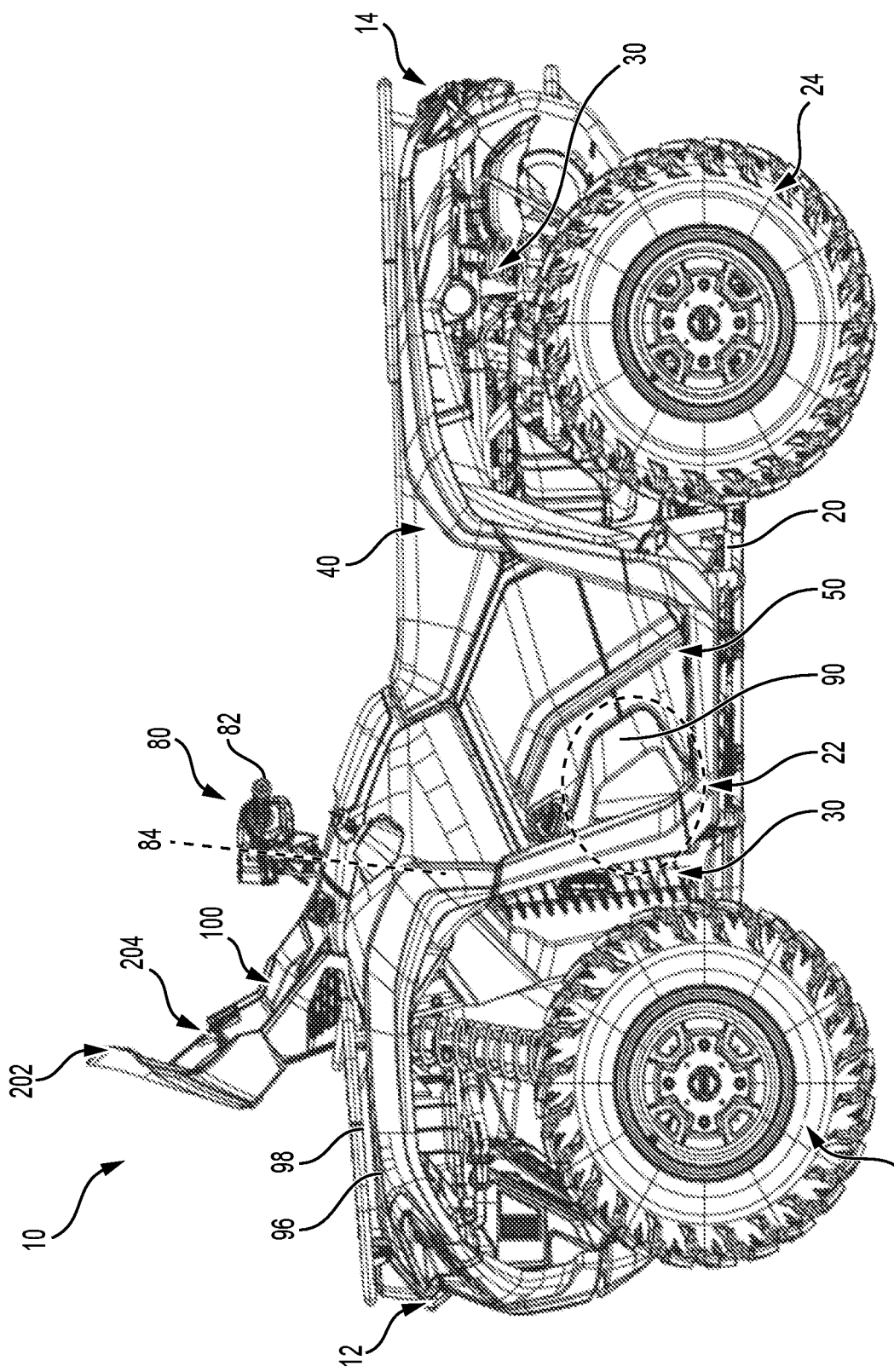
FIG. 2 is a left side elevation view of the vehicle of FIG. 1.
Figure 3:
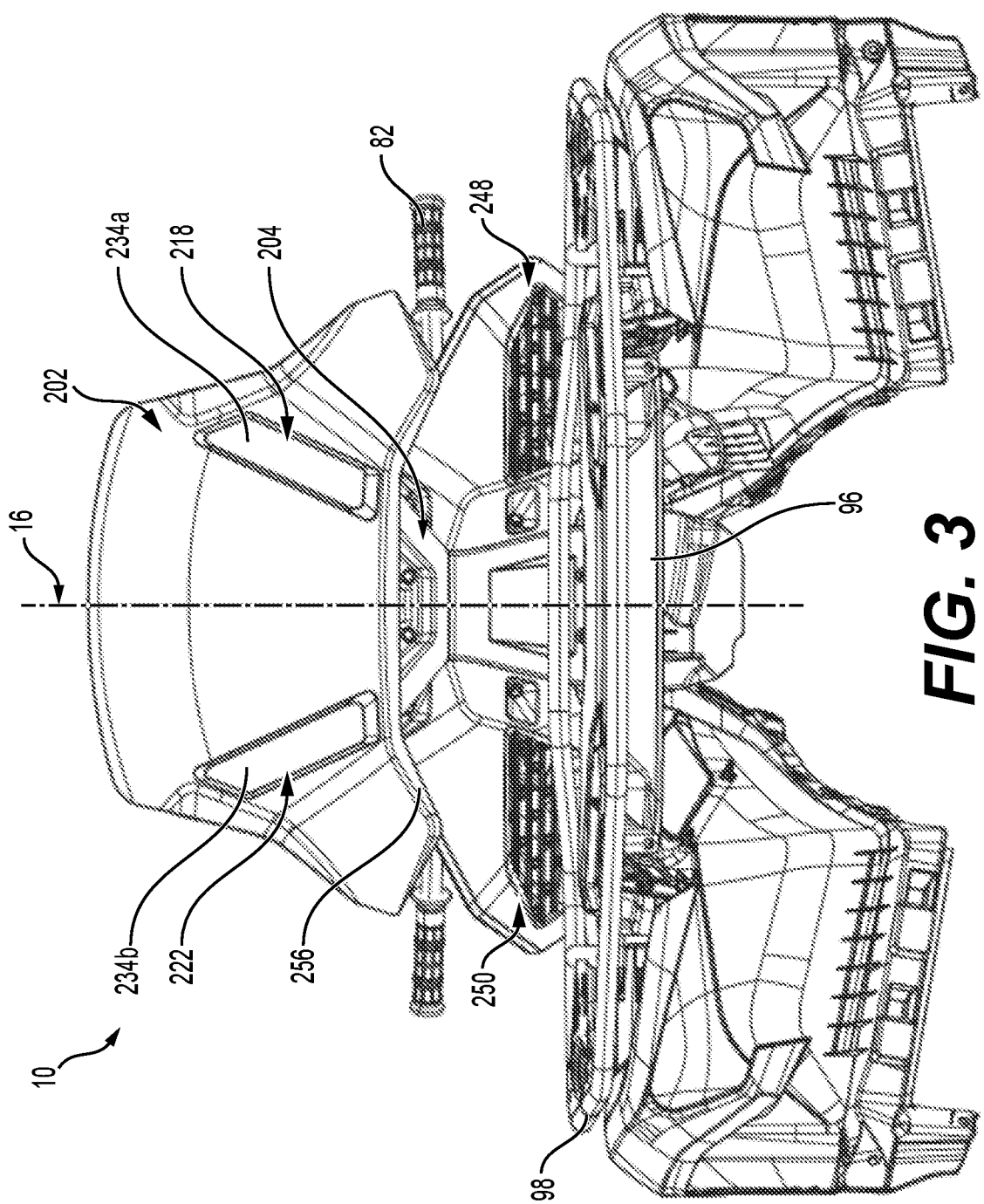
FIG. 3 is a front elevation view of a portion of the vehicle of FIG. 1.

Before describing the windshield assembly 200 in detail, the ATV 10 will be generally described. Referring to FIGS. 1 to 3, the ATV 10 has a front end 12 and a rear end 14 defined consistently with a forward travel direction of the ATV 10. A longitudinal center plane 16 (FIG. 3) extends vertically and longitudinally through the lateral center of the ATV 10. The ATV 10 has a frame 20.

A motor 22 (schematically shown in FIG. 2) is connected to the frame for powering the ATV 10. The ATV 10 has two front wheels 24 and two back wheels 24 (omitted in FIG. 3). The wheels 24 are operatively connected to the motor 22 via a transmission (not shown). In the present implementation, the motor 22 is an internal combustion engine and the transmission is a continuously variable transmission, but other types of motors and transmissions are contemplated. Each of the wheels 24 is provided with low-pressure balloon tires adapted for off-road conditions and traversing rugged terrain. It is contemplated that other implementations of the ATV 10 could have only three wheels 24. The two front wheels 24 are suspended from the frame 20 by left and right front suspension assemblies 30 while the two rear wheels 24 are suspended from the frame 20 by left and right rear suspension assemblies 30.

As best seen in FIGS. 1 and 2, the ATV 10 further includes a straddle seat 40 connected to the frame 20 for accommodating a driver of the ATV 10. Driver footrests 50 are provided on either side of the driver seat 40 and are disposed vertically lower than the driver seat 40 to support the driver's feet. A steering assembly 80 is rotationally connected to the frame 20 to enable a driver to steer the ATV 10. The steering assembly 80 includes a handlebar 82 connected to a steering column assembly for actuating steering linkages operatively connected to the left and right front wheels 24. The handlebar 82 is disposed forwardly of the driver seat 40. The handlebar 82 is rotatable about a steering column axis 84 (FIG. 2). Other steering input devices, such as a steering wheel, could be used in different vehicles.

A throttle operator 86 (FIGS. 1 and 2), in the form of a thumb-actuated throttle lever, is mounted to the handlebar 82. Other types of throttle operators, such as a finger-actuated throttle lever and a twist grip, are also contemplated. A gear shifter located near the handlebar 82 is connected to the transmission and enables a driver to select one of a plurality of gear configurations for operation of the ATV 10. In the illustrated implementation of the ATV 10, the gear configurations include park, neutral, reverse, low, and high. It is contemplated that the sequence and/or number of gear configurations could be different than as shown herein. A display cluster 88, including a number of gauges and buttons, is disposed forwardly of the steering assembly 80 (FIGS. 4 to 7).

As best seen in FIG. 1, a plurality of body panels are provided on the vehicle 10 to conceal the internal components of the vehicle 10, such as but not limited to cowlings 90 to cover the motor 22, fenders 92 disposed over each of the wheels 24, side panels 94 extending over lateral sides of the ATV 10, and a front panel 96 extending over a top side of the ATV 10 forward of the handlebar 82.

A front rack 98 is provided, which is connected to the frame 20, and mounted above the front panel 96. The front rack 98 is disposed forward of the handlebar 82. In certain implementations, the front rack 98 may be used to support a cargo box 200, which will be described later with reference to FIGS. 14 to 16.

Figure 5:
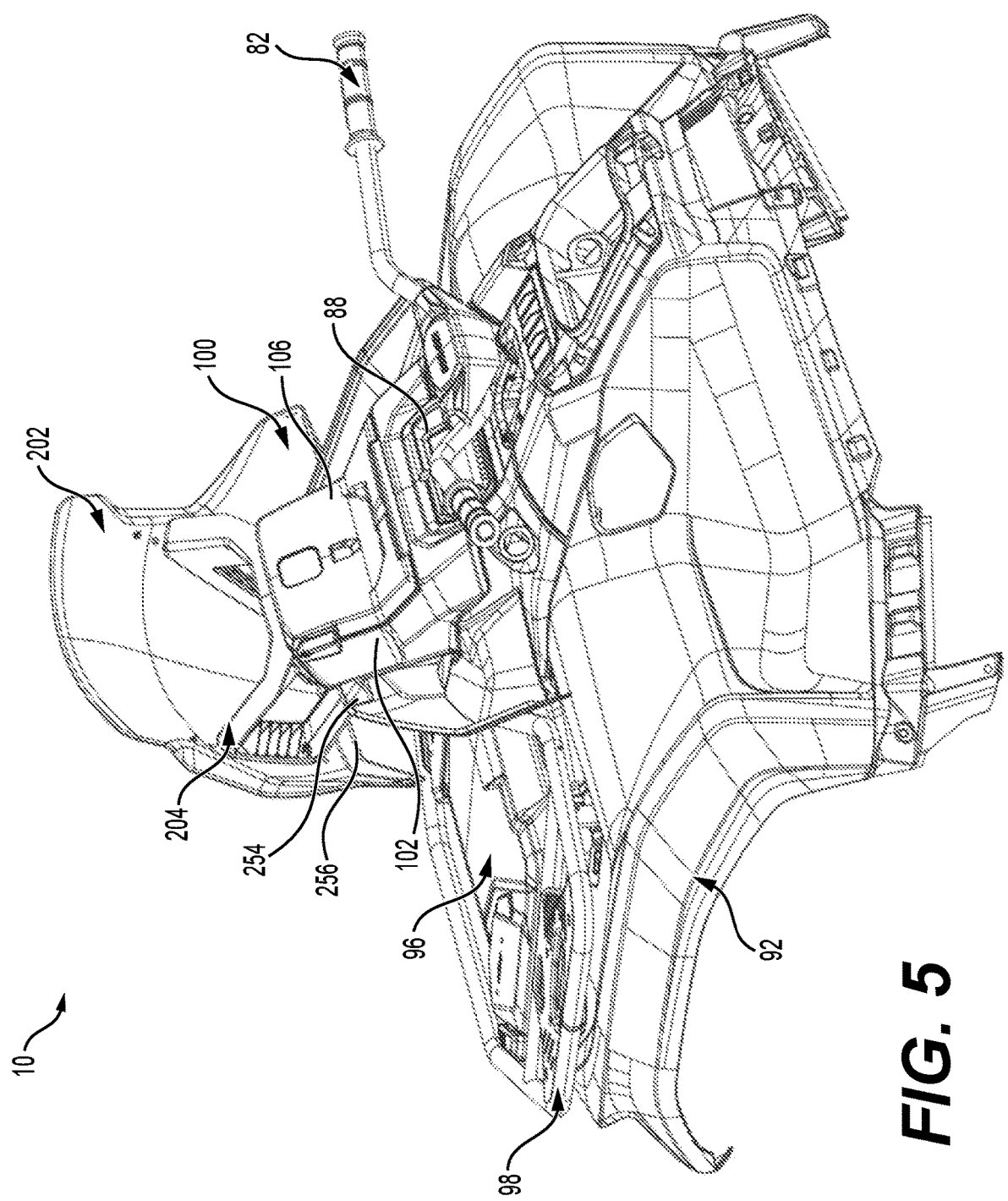
FIG. 5 is a perspective view taken from a top, back, left side of the portion of the vehicle of FIG. 4.
Figure 6:
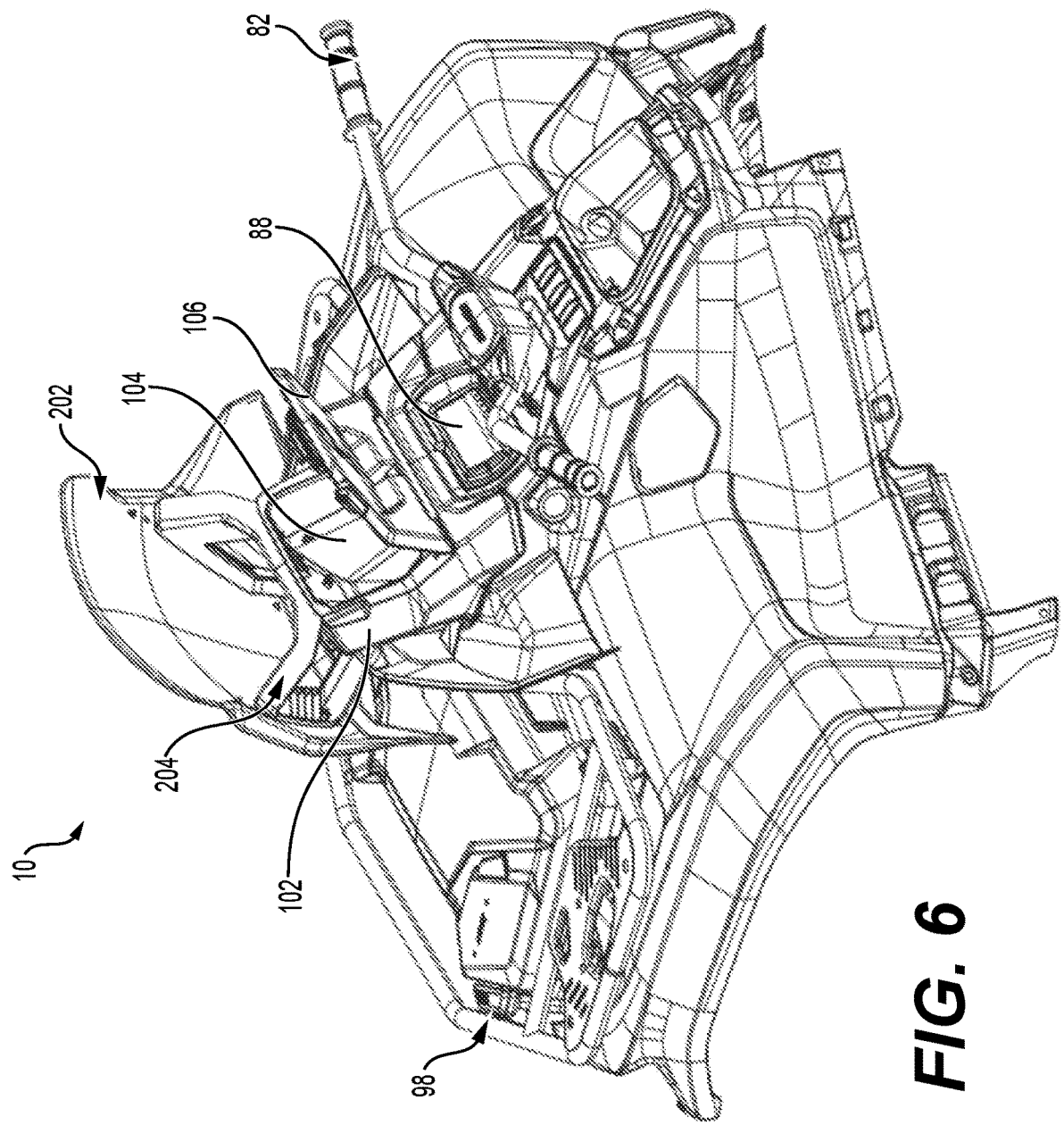
FIG. 6 is a perspective view taken from a top, back, left side of the portion of the vehicle of FIG. 4 with a lid of a storage compartment open.
Figure 7:
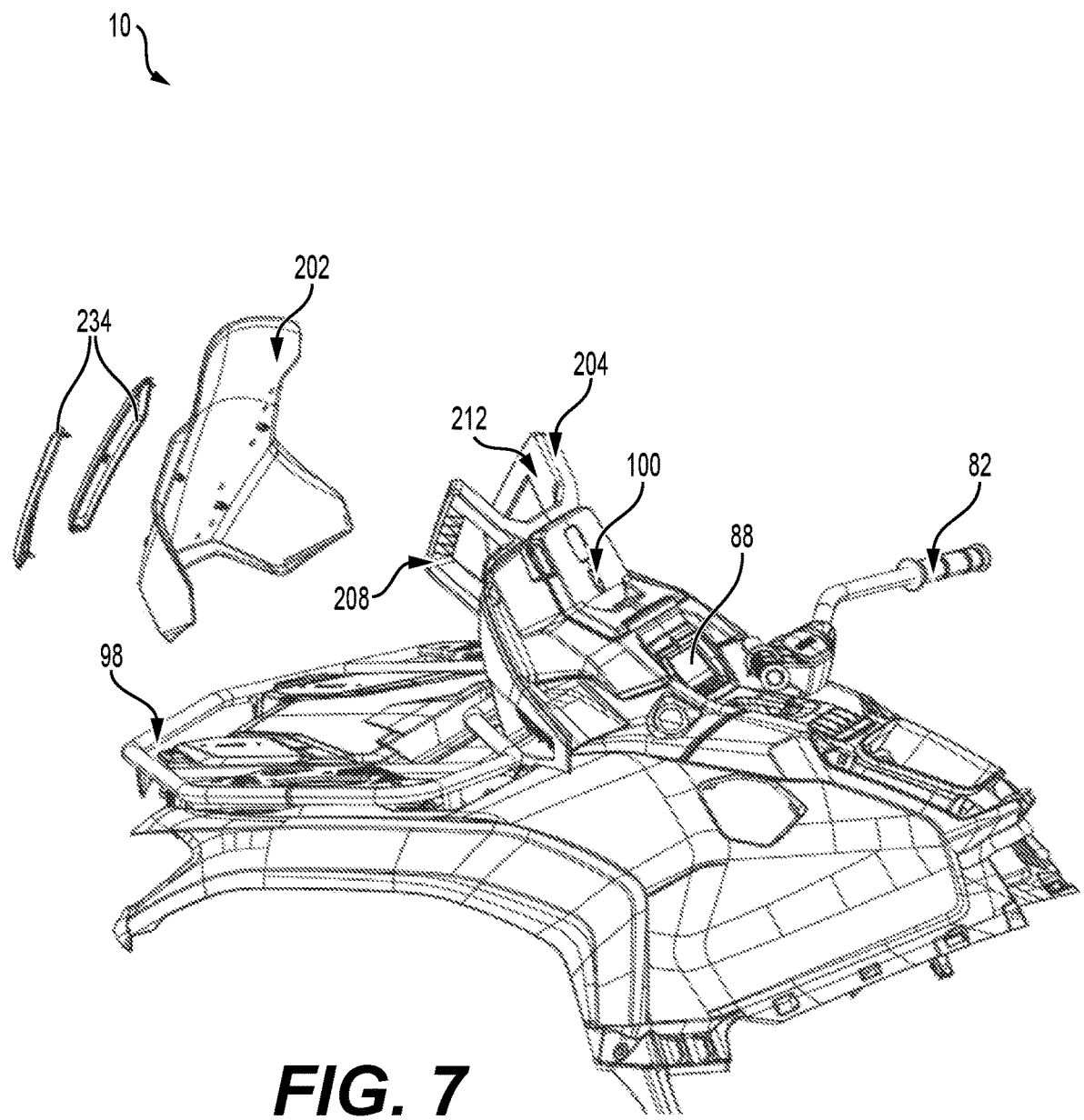
FIG. 7 is a perspective view taken from a top, back, left side of the portion of the vehicle of FIG. 4 with a partially exploded view of the windshield assembly.
Figure 8:
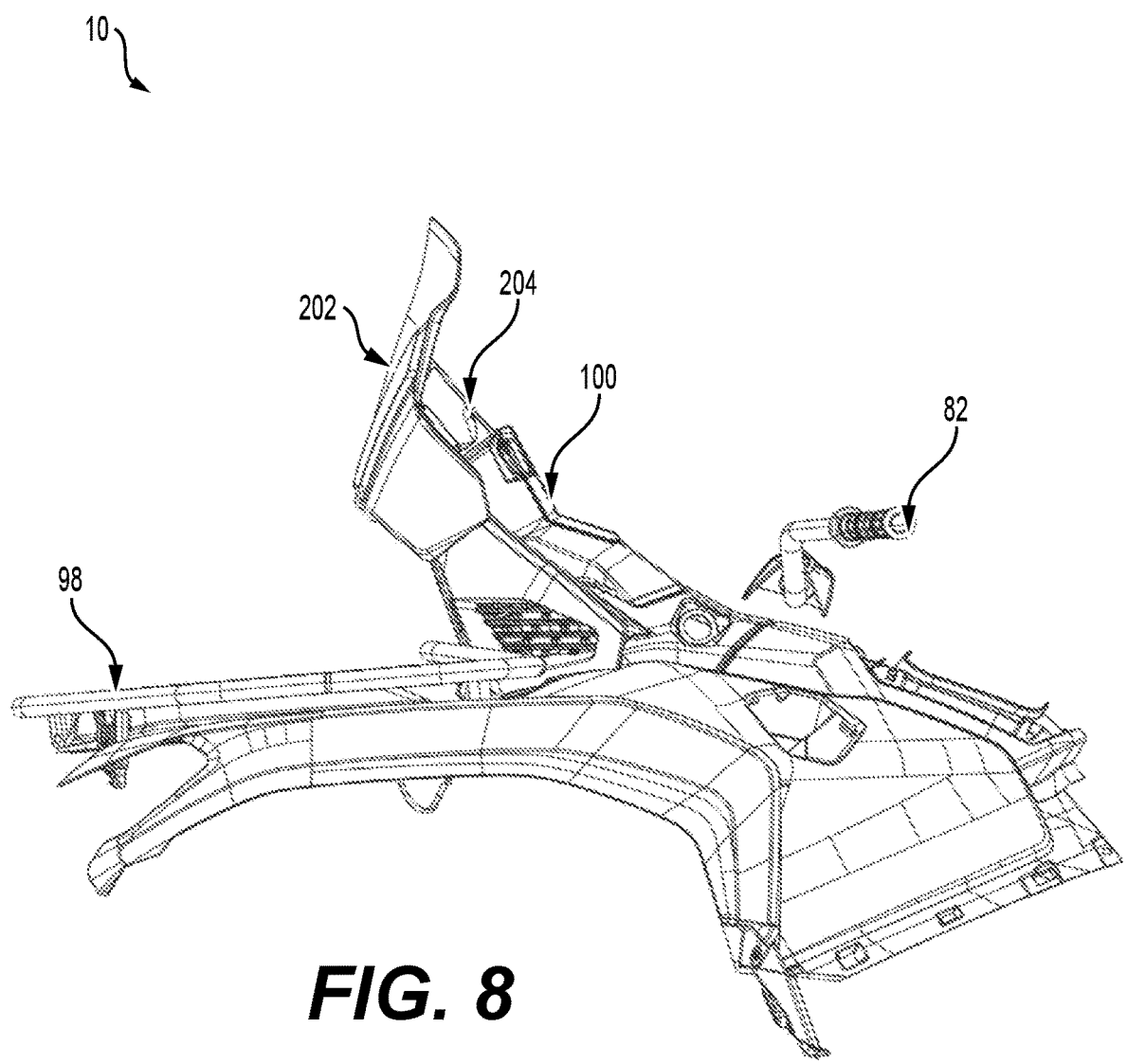
FIG. 8 is a left elevation view of the portion of the vehicle of FIG. 4.
Figure 9:
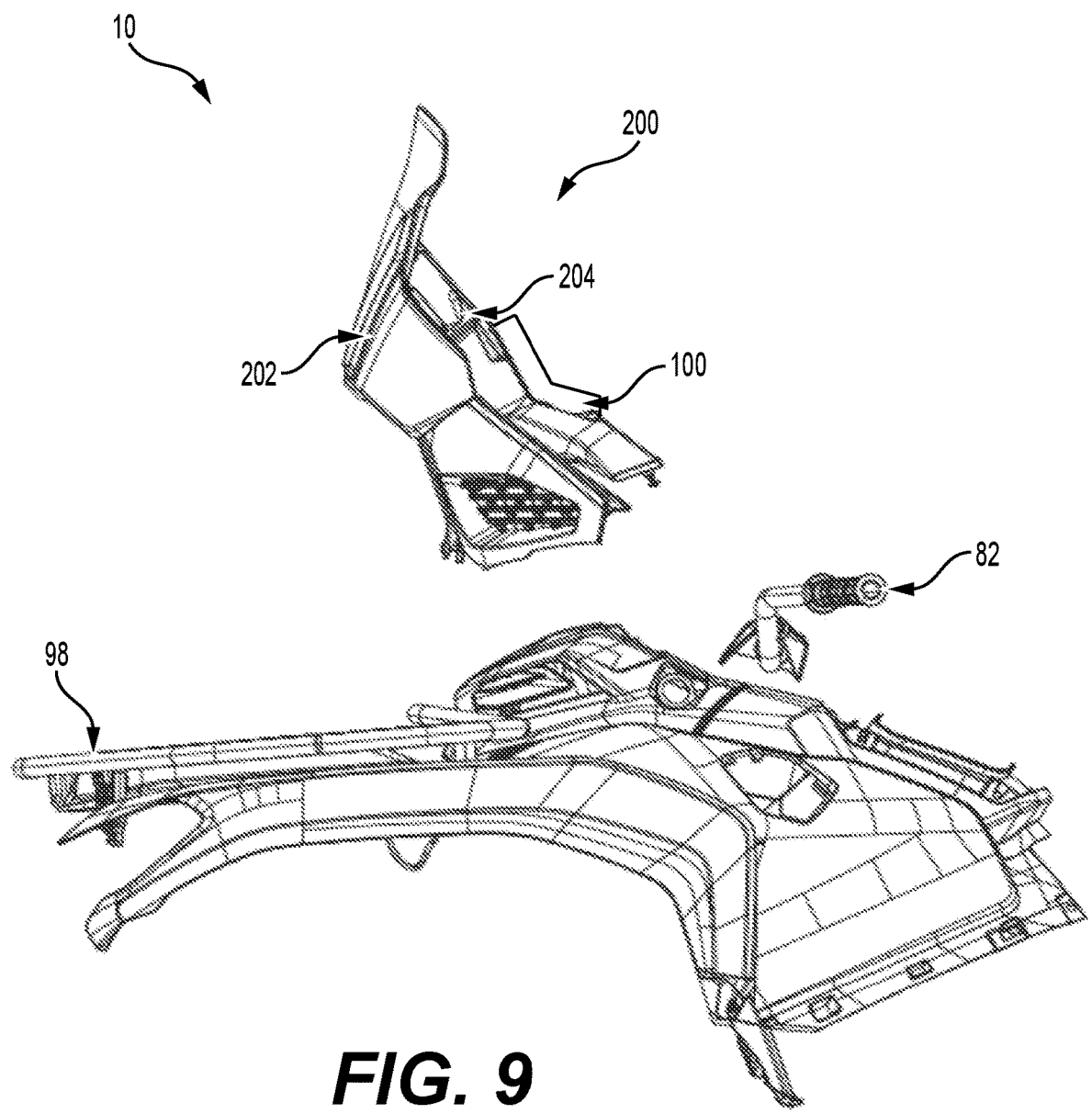
FIG. 9 is a left elevation view of the portion of the vehicle of FIG. 4, with the windshield assembly separated from the vehicle.
Figure 10:
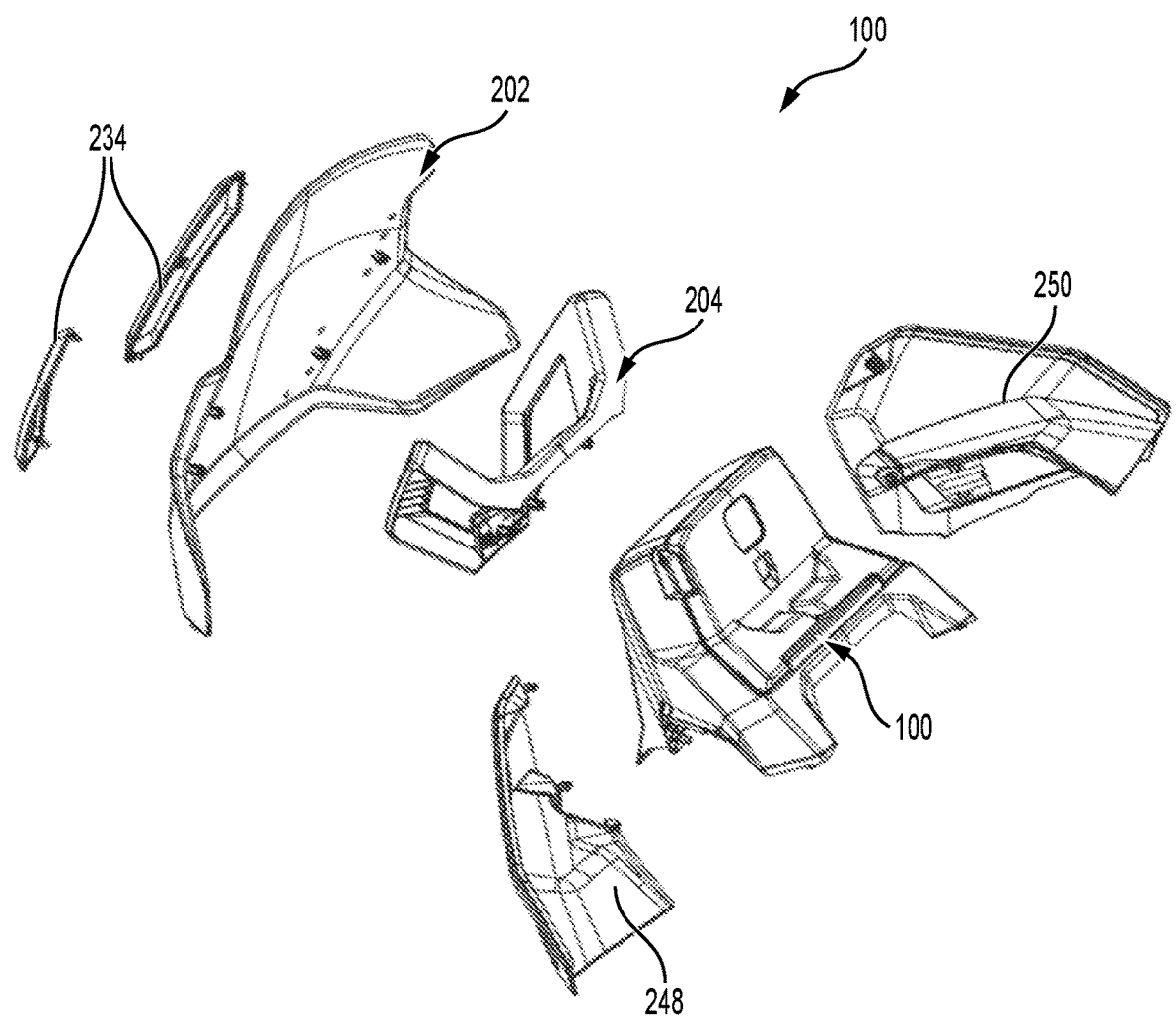
FIG. 10 is an exploded view of the windshield assembly of FIG. 1 taken from a top, back, left side.

A storage compartment 100 is provided forward of the handlebar 82 and rearward of the front rack 98. As best seen in FIG. 5, the storage compartment 100 is forward of the display cluster 88, in a dashboard region of the ATV 10. The storage compartment 100 comprises walls 102 defining a storage chamber 104 (FIG. 6) and a lid 106 which can be opened to access the storage chamber 104. At least one of the walls 102 is a forwardly facing wall 108.

The ATV 10 further includes other components such as an air intake system, an exhaust system, headlights, and the like. As it is believed that these components would be readily recognized by one of ordinary skill in the art, further explanation and description of these components will not be provided herein.

The windshield assembly 200 will now be described in more detail with reference to FIGS. 4 to 13.

The windshield assembly 200 comprises a windshield 202 connected to a windshield support 204. The windshield support 204 is connected to the frame 20 of the ATV 10 via the storage compartment 100. The windshield support 204 is disposed forward of the handlebar 82 and rearward of the front rack 98. The windshield support 204 thus connected is independent of the handlebar 82.

The windshield support 204 is mounted to the storage compartment 100 which is itself connected to the frame 20. More specifically, the windshield support 204 is mounted to the forwardly facing wall 108 of the storage compartment 100. In other implementations (not shown), the windshield support 204 may be connected directly to the front panel 96, or to the frame 20.

Figure 11:
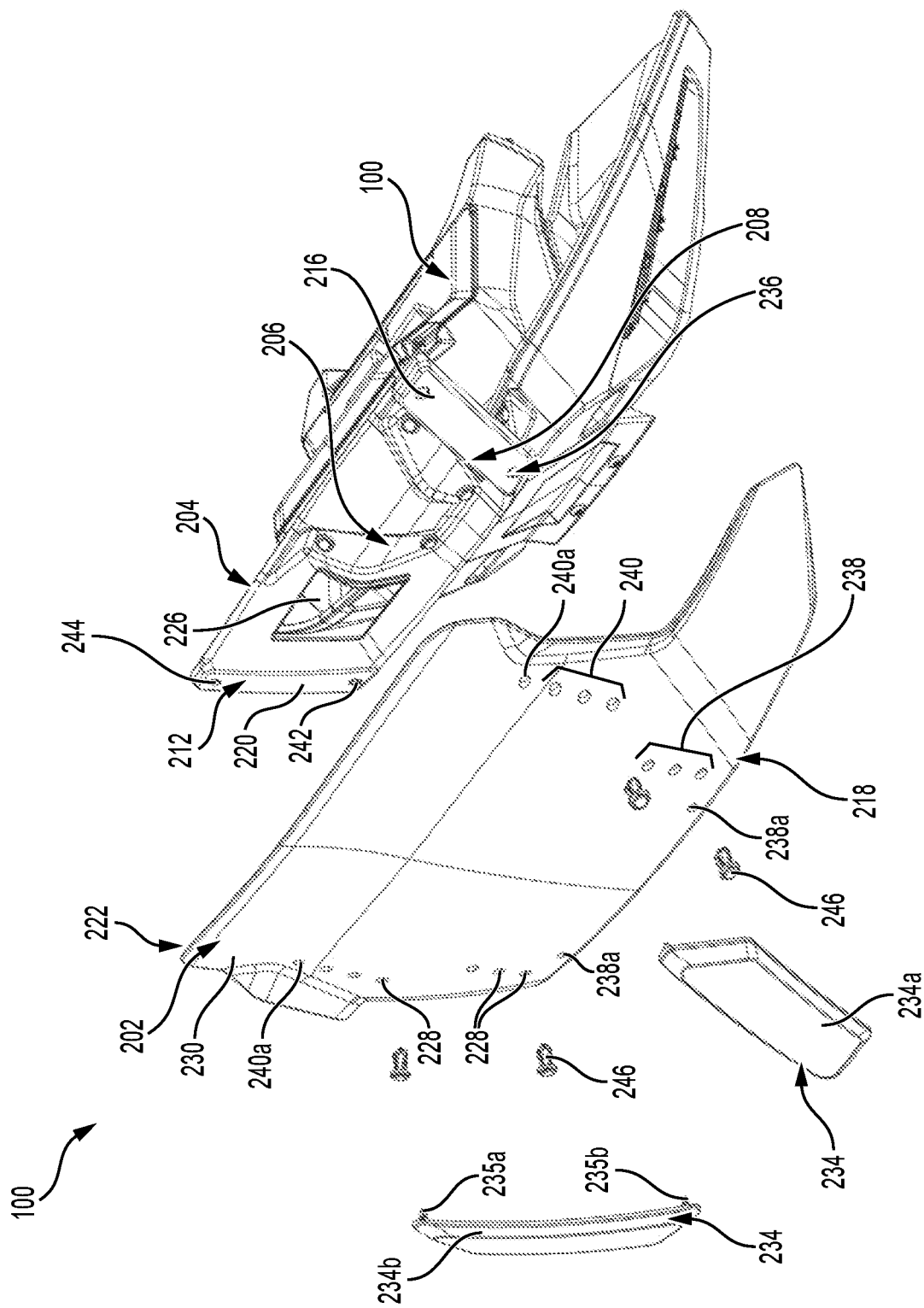
FIG. 11 is an exploded view of the windshield assembly of FIG. 1 taken from a top, front, left side.
Figure 12:
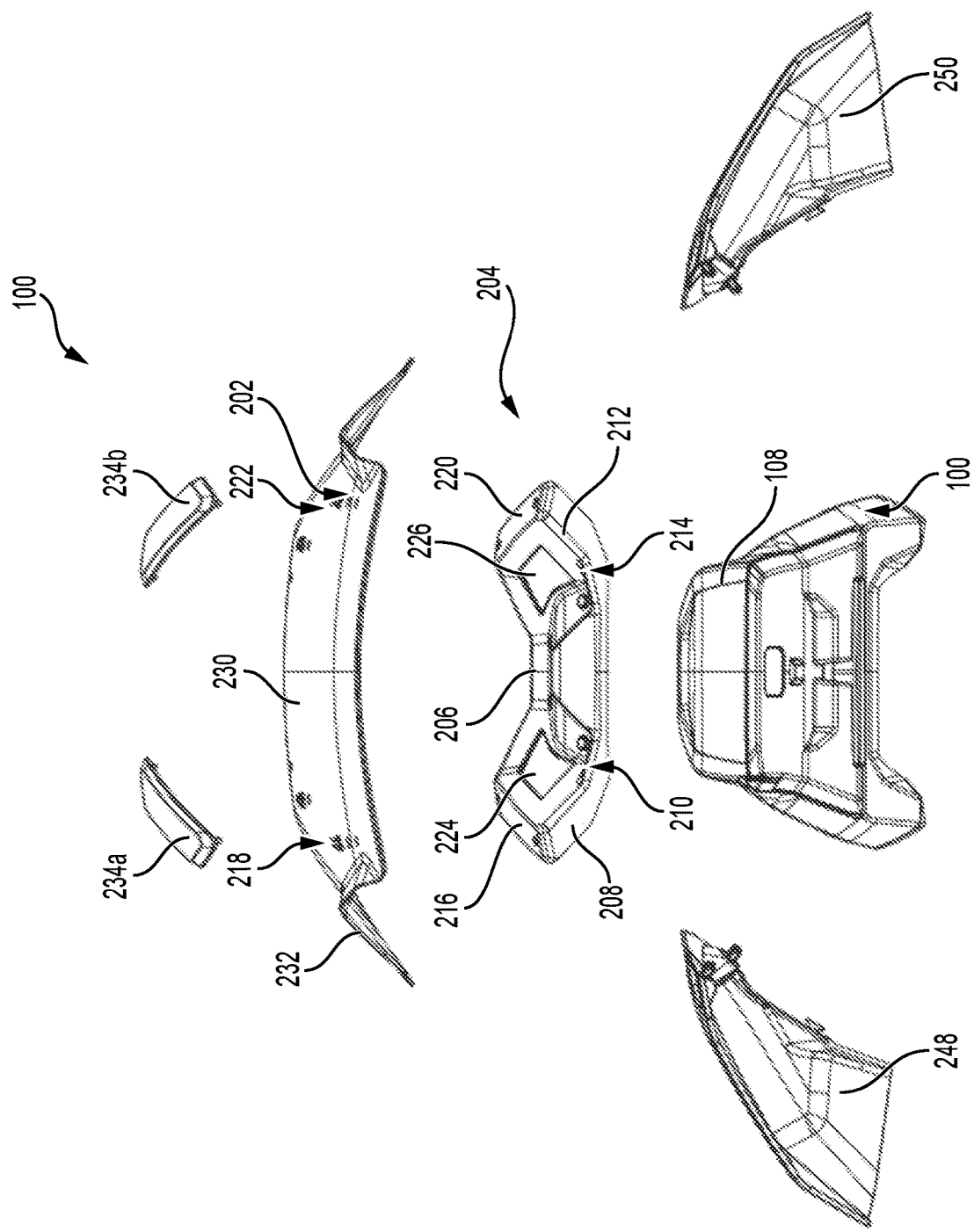
FIG. 12 is an exploded top plan view of the windshield assembly of FIG. 1.
Figure 13:
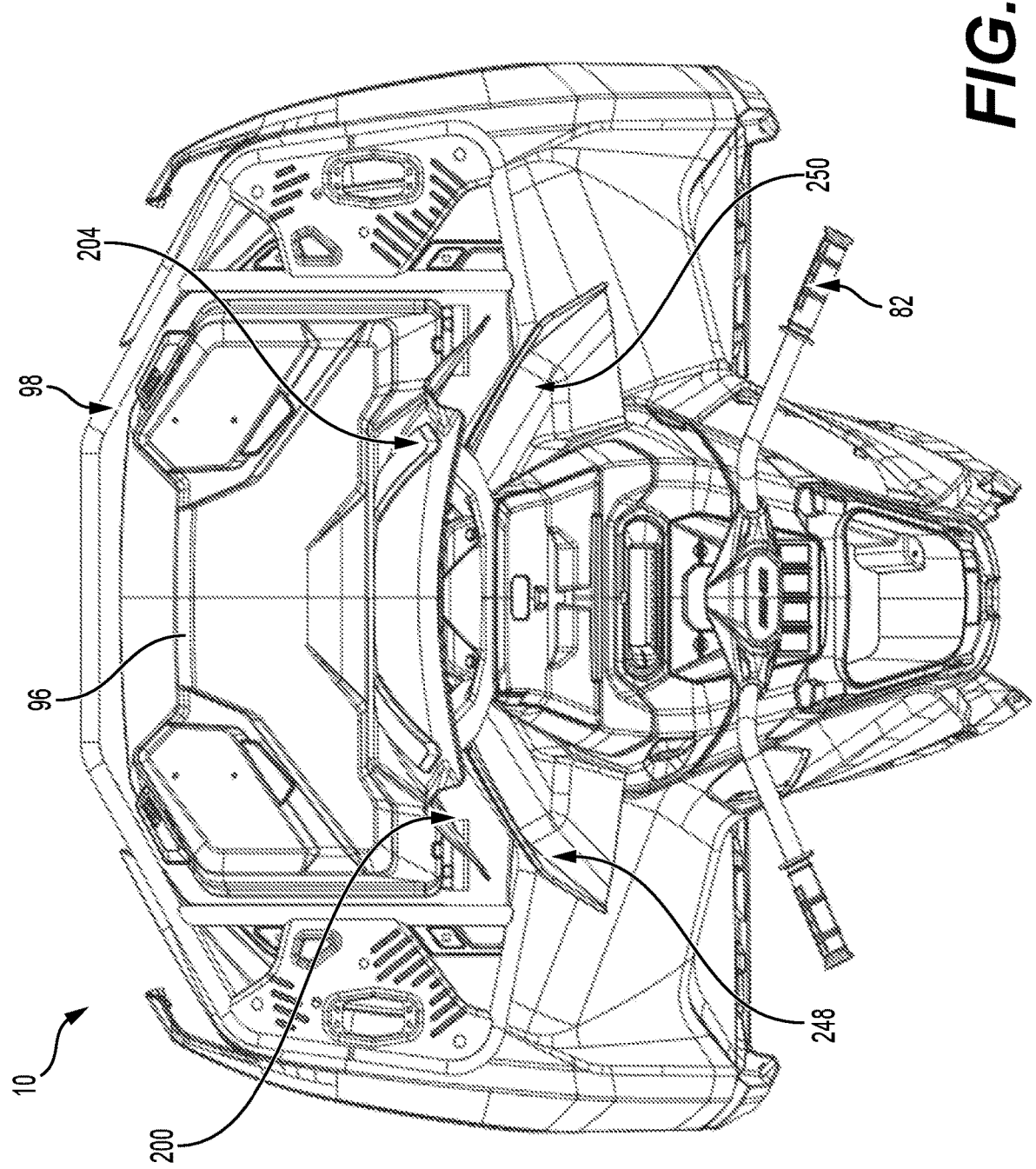
FIG. 13 is a top plan view of the portion of the vehicle of FIG. 3.

The windshield support 204 is configured to space the windshield 202 at a given height from the front panel 96 and at a given longitudinal distance from the handlebar 82. In this respect, and as best seen in FIGS. 11 and 12, the windshield support 204 comprises a central portion 206 which is connected to the forwardly facing wall 108 of the storage compartment 100 and which extends upwardly from the front panel 96; a left wing portion 208 which extends forwardly from a left side 210 of the central portion 206; and a right wing portion 212 which extends forwardly from a right side 214 of the central portion 206. The left wing portion 208 terminates in a left distal end 216. The left distal end 216 is connected to the windshield 202 at a left region 218 of the windshield 202. The right wing portion 212 terminates in a right distal end 220. The right distal end 220 is connected to the windshield 202 at a right region 222 of the windshield 202. The left distal end 216 and the right distal end 220 each extend generally vertically along the back of the respective left and right regions of the windshield, 218, 222.

The left wing portion 208 has a left wing opening 224 formed therein and the right wing portion 212 has a right wing opening 226 formed therein. In other implementations, there are no openings in the left and right wing portions 224, 226. In other implementations, there is more than one opening in the left and right wing portions 224, 226.

The windshield 202 has windshield apertures 228 extending therethrough, each windshield aperture 228 extending between a front side 230 and a back side 232 of the windshield 202. The windshield apertures 228 are defined in the windshield 202 as pairs. For each pair of the windshield apertures 228, one of the pair is defined in the left region 218 of the windshield 202 and the other of the pair is defined in the right region 222 of the windshield 202. On each of the left and right regions 218, 222 of the windshield 202, the windshield apertures 228 are grouped as a lower set 238 of the windshield apertures 228 and an upper set 240 of the windshield apertures 228. The pairs of windshield apertures 228 in the upper set 240 are more widely laterally spaced from each other than the pairs of windshield apertures 228 in the lower set 238. The windshield apertures 228 of each pair are positioned one above each other. As illustrated, there are three pairs of windshield apertures 228 in the lower set 238 and three pairs of windshield apertures 228 in the upper set 240. The multiple aperture pairs in each of the lower set 238 and the upper set 240 permit a height of the windshield 202 relative to the frame 20 to be adjusted, in a manner that will be described below.

An upper cover pair 240a of the windshield apertures 228 in the upper set 240, and a lower cover pair 238a of the windshield apertures 228 in the lower set 238 are used to attach a cover 234 to hide at least some of the windshield apertures 228. In this respect, there is provided a left cover 234a which is sized and shaped to extend over the windshield apertures 228 on the left region 218 of the windshield, and a right cover 234b which is sized and shaped to extend over the windshield apertures 228 on the right region 222 of the windshield 202. Each of the left cover 234a and the right cover 234b has an upper projection 235a and a lower projection 235b which are received into the respective apertures of the upper cover pair 240a of the windshield apertures 228 in the upper set 240, and the lower cover pair 238b of the windshield apertures 228 in the lower set 238. The covers 234 are removably connectable to the front side 230 of the windshield 202. In certain implementations, one or both of the left cover 234a and the right cover 234b may be omitted.

With continued reference to FIG. 11, the windshield support apertures 236 comprise a lower pair 242 and an upper pair 244. One windshield support aperture 236 of the lower pair 242 is defined within the distal end 216 of the left wing portion 208, and the other windshield support aperture 236 of the lower pair 242 is defined within the distal end 220 of the right wing portion 212. Similarly, one windshield support aperture 236 of the upper pair 244 is defined within the distal end 216 of the left wing portion 208, and the other windshield support aperture 236 of the upper pair 244 is defined within the distal end 220 of the right wing portion 212. The upper pair 244 of the windshield support apertures 236 are positioned upwardly, on the respective distal ends 216, 220 of the windshield support apertures 236, of the lower pair 242.

The windshield 202 is connected to the windshield support 204 by aligning one pair of the lower set 238 of the windshield apertures 228 with the lower pair 242 of the windshield support apertures 236, and one pair of the upper set 240 of windshield apertures 228 with the upper pair 244 of the windshield support apertures 236, and extending a fastener 246 through each aligned aperture of the windshield 202 and the windshield support 204. The windshield assembly 100 is provided with four fasteners 246 for connecting the windshield 202 and the windshield support 204. Each windshield aperture 228 and windshield support aperture 236 is configured to receive the fasteners 246. Connection of the windshield 202 to the windshield support 204 is thus achieved by the fasteners 246 extending at least partially into, and between, respective windshield and windshield support apertures 228, 236. The fasteners 246 may comprise grommets, pegs or any other configuration permitting removal and installation from the windshield and windshield support apertures 228, 236. This can permit convenient repositioning of the windshield 202.

As mentioned above, there are multiple windshield apertures 228 in each of the lower set 238 and the upper set 240, permitting an adjustment of the height of the windshield 202 relative to the frame 20 and the windshield support 204. More specifically, the three pairs of windshield apertures 228 in the lower and upper sets 238, 240 can permit the windshield to be positioned at three different heights: lowest, highest and medium heights relative to the windshield support 204.

When the windshield 202 is connected to the windshield support 204 using the lowermost pair of the windshield apertures 228 of each of the lower set 238 and the upper set 240, the height of the windshield 202 is at a highest height relative to the windshield support 204. When the windshield 202 is connected to the windshield support 204 using the uppermost pair of the windshield apertures 228 of each of the lower set 238 and the upper set 240, the height of the windshield 202 is at a lowest height relative to the windshield support 204. When the windshield 202 is connected to the windshield support 204 using the middle pair of the windshield apertures 228 of each of the lower set 238 and the upper set 240, the height of the windshield 202 is at a height between the lowest and highest heights relative to the windshield support 204. In other implementations, the windshield 202 can be provided with more than three windshield 202 height options or less than three windshield 202 height options.

Further height options of the windshield 202 can be obtained using windshield supports 204 having different sizes of the windshield support 204. For example, windshield supports 204 having the central portion 206 with different heights can be provided as a kit. In some implementations, the kit includes three different windshield supports 204 each having a different height, thus providing an option of nine different heights of the windshield (three height adjustments per windshield support 204).

Further height options of the windshield 202 can be obtained using windshields 202 of different lengths. For example, windshields 202 having different lengths can be provided as a kit together with other components of the windshield assembly 200.

Figure 4:
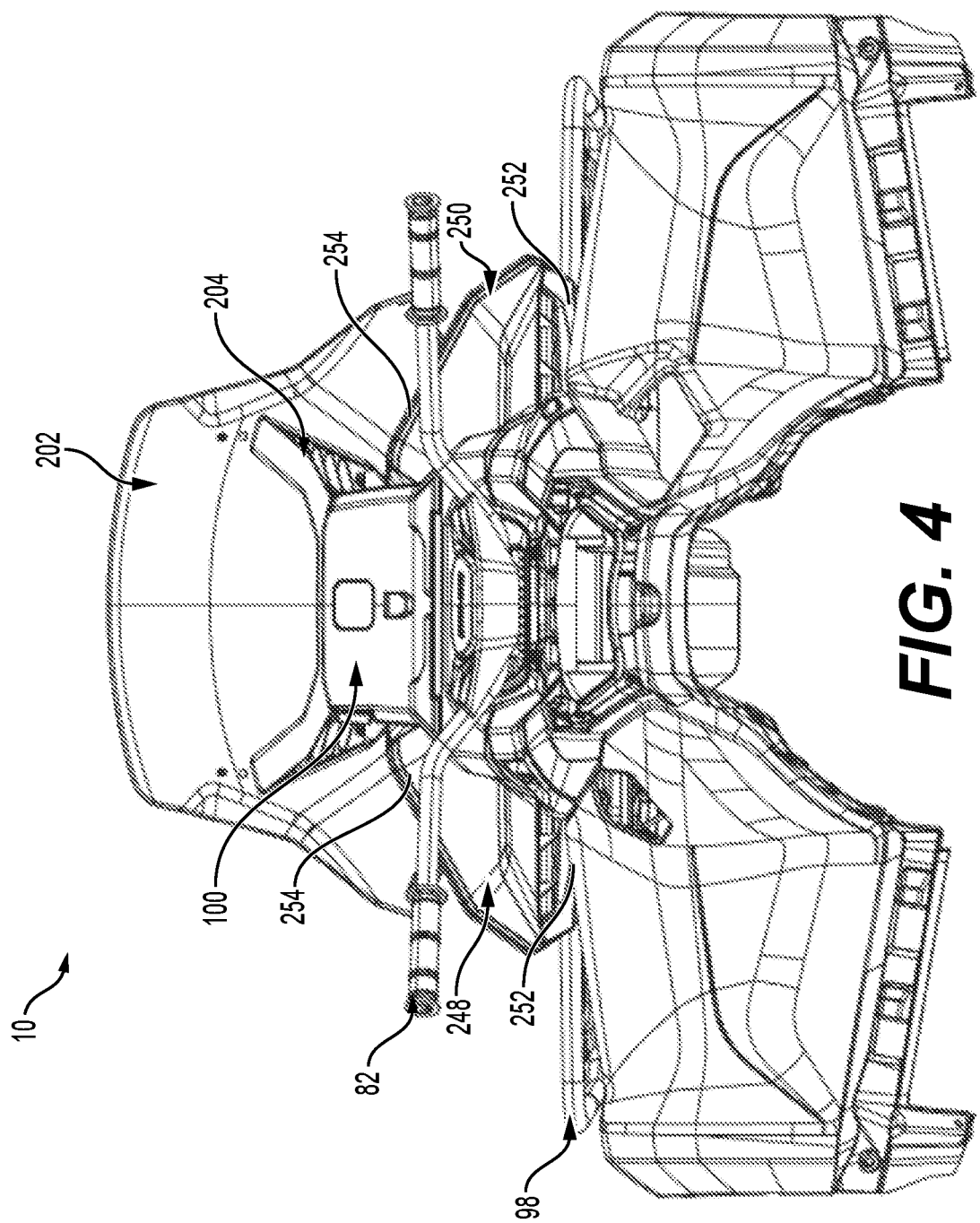
FIG. 4 is a back elevation view of the portion of the vehicle of FIG. 3.

The windshield assembly 200 further comprises a left wind deflector 248 and a right wind deflector 250 connected to a left side and a right side, respectively, of the storage compartment 100. Each of the left wind deflector 248 and the right wind deflector 250 has a lower edge 252 and an upper edge 254 (FIGS. 3 and 4). The lower edge 252 of the left wind deflector 248 and the right wind deflector 250 is lower than a lower edge 256 of the windshield 202 (FIG. 3). This can protect the driver from oncoming flow of air when the ATV 10 is in motion. The left wind deflector 248 and a right wind deflector 250 may deflect any wind that passes under the windshield 202. The lower edge 256 of the windshield 202 is lower than the respective upper edges 254 of the left wind deflector 248 and the right wind deflector 250 (FIG. 5).

In other implementations, the left wind deflector 248 and the right wind deflector 250 are connected to the windshield 202. The left wind deflector 248, the right wind deflector 250 and the windshield 202 may be one piece. In yet other implementations, the left wind deflector 248 and the right wind deflector 250 may be omitted.

Figure 14:
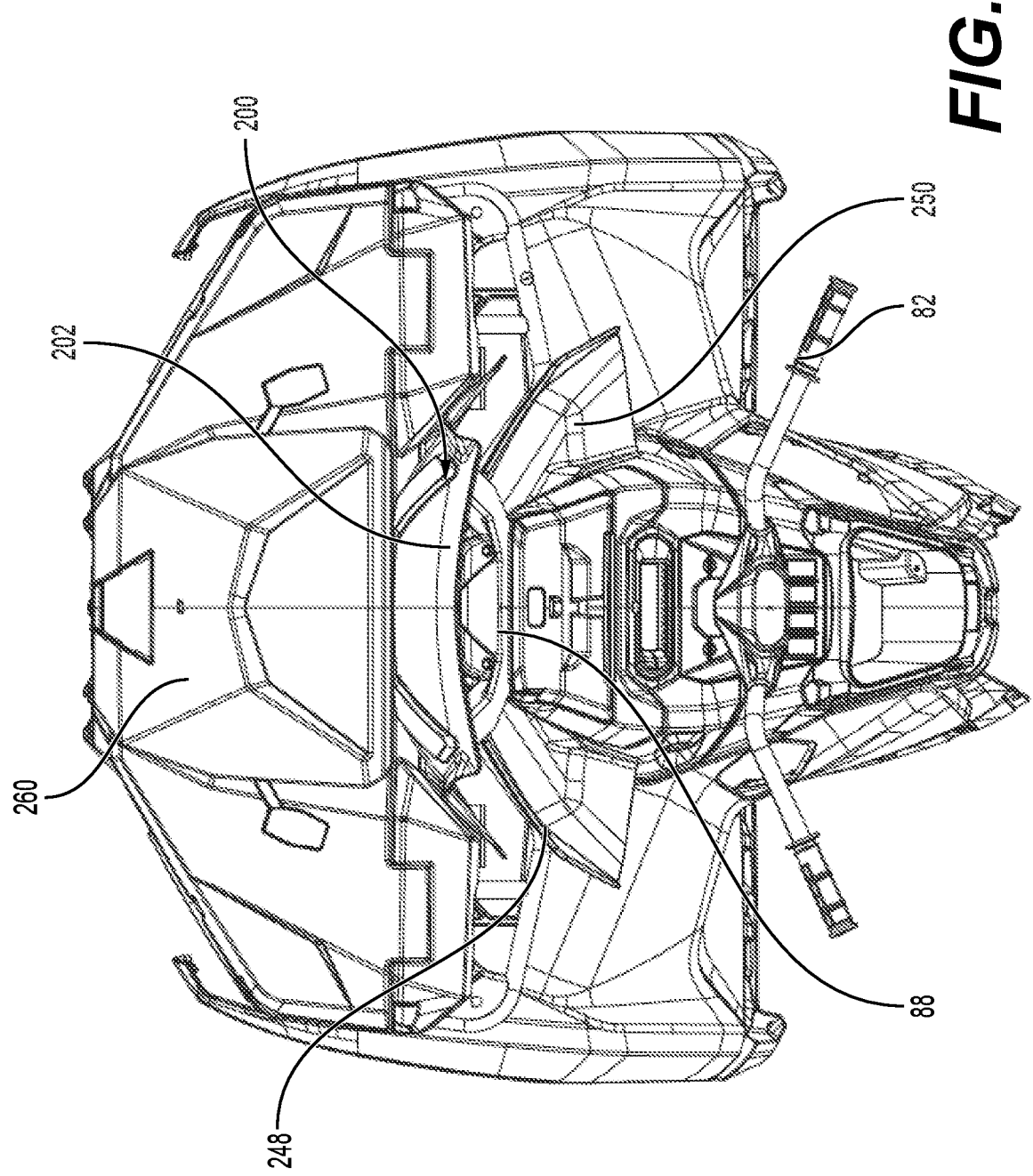
FIG. 14 is a top plan view of the portion of the vehicle of FIG. 3, and including a cargo box with a lid.
Figure 15:
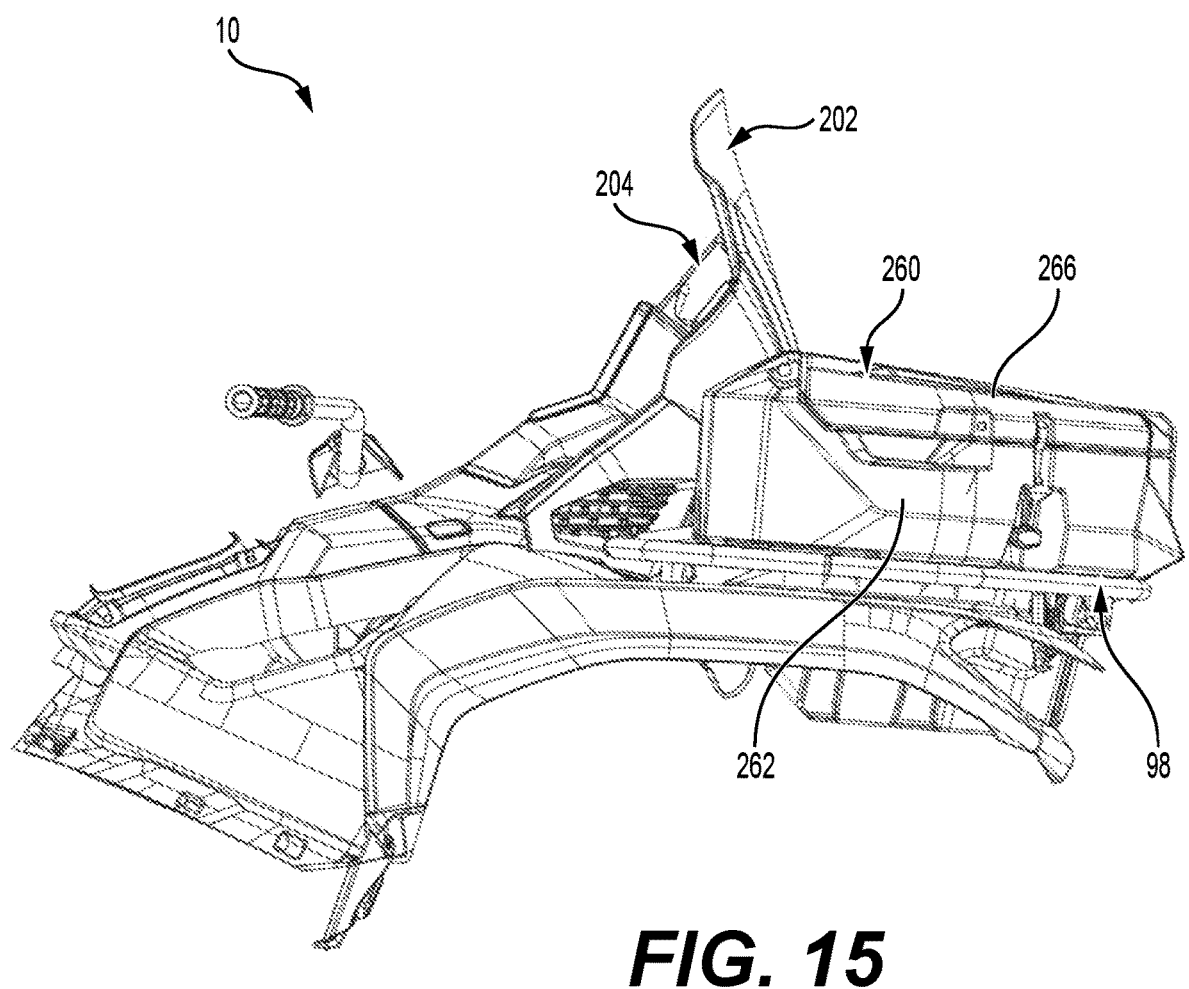
FIG. 15 is a right elevation view of the portion of the vehicle and cargo box of FIG. 14.
Figure 16:
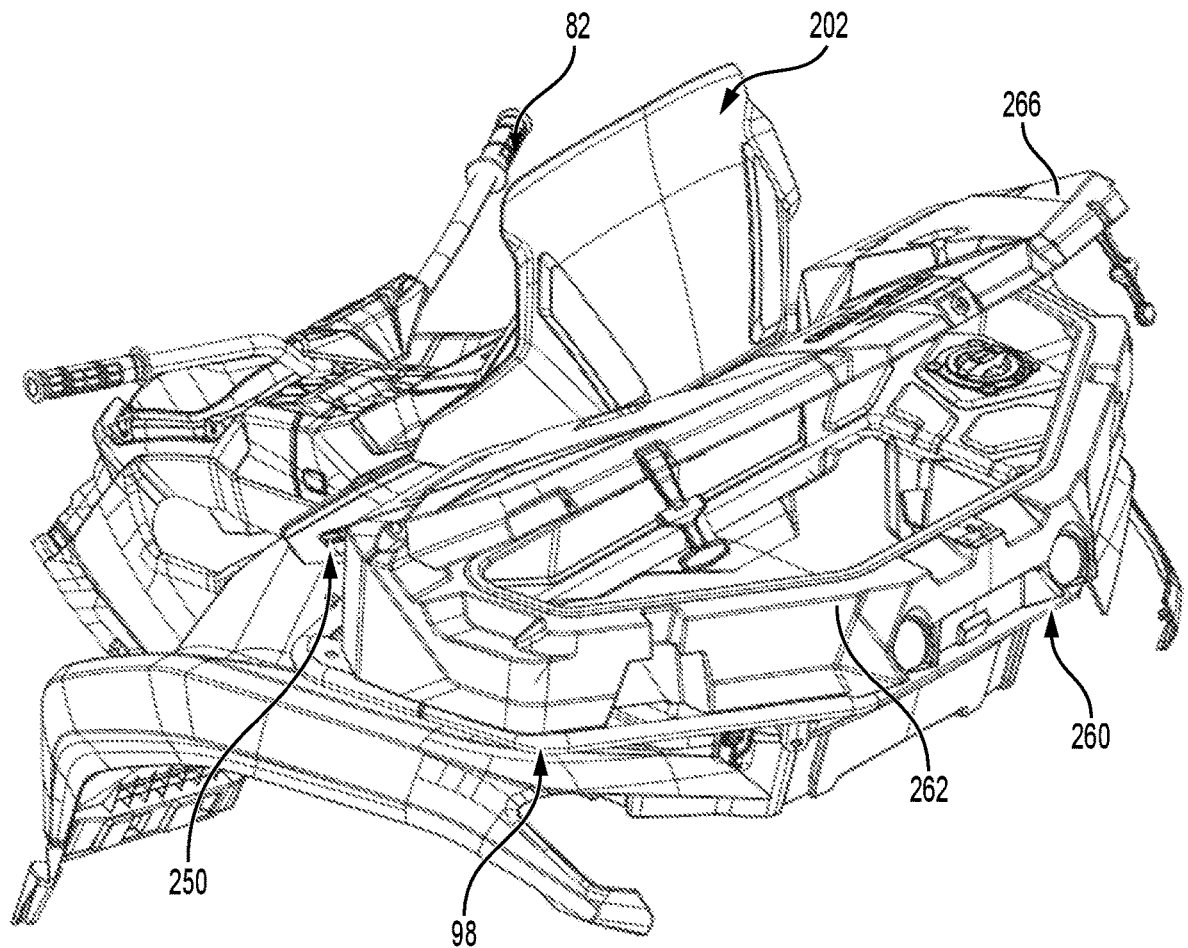
FIG. 16 is a perspective view taken from a top, front, right side of the portion of the vehicle and cargo box of FIG. 14 with the lid of the cargo box open.

Referring now to FIGS. 14 to 16, in some implementations, the ATV includes a cargo box 260 attached to the front rack 98. The cargo box 260 is disposed forward of the windshield 202 and the windshield support 204. The cargo box 260 includes a container portion 262 defining a cargo chamber 264 and a lid 266 connected to the container portion 262 and moveable between closed and open positions. As best seen in FIG. 16, the lid 266 is connected to the container portion 262 such that the lid 266 opens rearwardly so that a user can access the cargo chamber 264 from the front end 12 of the ATV. The cargo box 260 can be implemented in any suitable manner.

By virtue of the positioning of the windshield support 204 forward of the handlebar 82 and rearward of the front rack 98, the lid 266 of the cargo box 260 can be opened without interfering with the windshield 202.

With reference to FIGS. 1 to 13, an illustrative scenario describing the installation and use of the windshield assembly 200 with the ATV 10 is provided below.

Initially, the windshield assembly 200 is separate from the ATV 10. When a user desires to install the windshield assembly 200 on the ATV 10, the user first selects the windshield support 204 with a desired height from a first windshield support and a second windshield support, the second windshield support being taller than the first windshield support.

Next, the user connects the selected windshield support to the frame 20 of the ATV 10 at a position forward of the seat 40 and between the handlebar 82 of the ATV 10 and the front rack 98 of the ATV 10.

Then, the user connects the windshield 202 to the selected windshield support 204. Connecting the windshield 202 to the selected windshield support 204 comprises inserting a pair of the fasteners 246 through a pair of the windshield apertures 228 in the lower set 238 and a pair of windshield apertures 228 in the upper set 240 such that they protrude outwardly from the back side 232 of the windshield. The pair of the windshield apertures 228 are selected from a plurality of windshield apertures 228 in each of the lower set 238 and the upper set 240 according to the desired height of the windshield 202. The protruding portions of the fasteners 246 are inserted into the windshield support apertures 236. It will be appreciated that the windshield 202 is at a first height relative to the frame 20 when the fasteners 246 are inserted through one pair of the windshield apertures 228 in the lower and upper sets 238, 240 and at another different height when the fasteners 246 are inserted through another pair of the windshield apertures 228 in the lower and upper sets 238, 240 upper sets 238, 240.

Next, the covers 234a, 234b are attached, one on each of the left region 218 and the right region 222, at the front side 230 of the windshield 202 by inserting the upper and lower projections 235a, 235b into the upper cover pair 240a of the windshield apertures 228 in the upper set 240, and the lower cover pair 238a of the windshield apertures 228 in the lower set 238.

Finally, the left and right wind deflectors 248, 250 are attached to the storage compartment 100. It will be appreciated that the left and right wind deflectors 248, 250, when present, can be attached to the storage compartment 100 at any stage, such as before the connection of the windshield 202 to the selected windshield support 204.

In other implementations, the windshield assembly 200 can be installed on the ATV 10 as follows.

Initially, the windshield assembly 200 is separate from the ATV 10. When a user desires to install the windshield assembly 200 on the ATV 10, the user first selects the windshield 202 with a desired length from a first windshield and a second windshield, the second windshield being longer than the first windshield.

Next, the user connects the selected windshield 202 to the windshield support 204. Connecting the selected windshield 202 to the windshield support 204 comprises inserting a pair of the fasteners 246 through a pair of the windshield apertures 228 in the lower set 238 and a pair of windshield apertures 228 in the upper set 240 such that they protrude outwardly from the back side 232 of the windshield. The pair of the windshield apertures 228 are selected from a plurality of windshield apertures 228 in each of the lower set 238 and the upper set 240 according to the desired height of the windshield 202. The protruding portions of the fasteners 246 are inserted into the windshield support apertures 236. It will be appreciated that the windshield 202 is at a first height relative to the frame 20 when the fasteners 246 are inserted through one pair of the windshield apertures 228 in the lower and upper sets 238, 240 and at another different height when the fasteners 246 are inserted through another pair of the windshield apertures 228 in the lower and upper sets 238, 240 upper sets 238, 240.

The windshield support 204 with the windshield 202 attached thereto is connected to the frame 20 of the ATV 10 at a position forward of the seat 40 and between the handlebar 82 of the ATV 10 and the front rack 98 of the ATV 10.

Next, the covers 234a, 234b are attached, one on each of the left region 218 and the right region 222, at the front side 230 of the selected windshield 202 by inserting the upper and lower projections 235a, 235b into the upper cover pair 240a of the windshield apertures 228 in the upper set 240, and the lower cover pair 238a of the windshield apertures 228 in the lower set 238. It will be appreciated that the covers 234a, 234b may be attached to the selected windshield 202 before the windshield support 204 is connected to the frame 20 of the ATV 10.

Finally, the left and right wind deflectors 248, 250 are attached to the storage compartment 100. It will be appreciated that the left and right wind deflectors 248, 250, when present, can be attached to the storage compartment 100 at any stage, such as before the connection of the windshield 202 to the selected windshield support 204.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A vehicle comprising:
a frame;
a driver seat connected to the frame;
a handlebar disposed forward of the driver seat, the handlebar rotatable about a steering column axis;
a storage rack connected to the frame, the storage rack being disposed forward of the handlebar;
a primary windshield support connected to the frame, the primary windshield support being disposed forward of the handlebar and rearward of the rack;
a secondary windshield support connected to the frame, the primary windshield support being connected to and supported by the secondary windshield support;
the secondary windshield support comprising a storage compartment,
the storage compartment has a front wall and a door, the door being rearward of the front wall, and the primary windshield support being mounted to the front wall of the storage compartment; and
a windshield connected to the primary windshield support, the handlebar rotating relative to the windshield.

2. The vehicle of claim 1, wherein the primary windshield support extends upwardly from the frame.

3. The vehicle of claim 1, wherein the primary windshield support comprises:
a central portion which is connected to the frame and extends upwardly from the frame,
a left wing portion extending forwardly from a left side of the central portion and connected to the windshield at a left region of the windshield; and
a right wing portion extending forwardly from a right side of the central portion and connected to the windshield at a right region of the windshield.

4. The vehicle of claim 3, wherein each of the left wing portion and the right wing portion has a distal surface which abuts the windshield and extends upwardly along the respective left and right regions of the windshield.

5. The vehicle of claim 3, wherein each of the left wing portion and the right wing portion have one or more wing openings formed therein.

6. The vehicle of claim 1, wherein the windshield defines windshield apertures, each of the windshield apertures being configured to receive a fastener therethrough for engagement with a corresponding windshield support aperture in the primary windshield support.

7. The vehicle of claim 6, wherein the windshield apertures comprise a lower set of windshield apertures and an upper set of windshield apertures.

8. The vehicle of claim 6, wherein the windshield apertures are configured such that the windshield can be connected to the primary windshield support at a first height from the frame or at a second height from the frame, the first and second heights being different.

9. The vehicle of claim 6, further comprising a cover connected to the windshield on a forward side of the windshield, the cover covering at least some of the windshield apertures.

10. The vehicle of claim 1, wherein the primary windshield support is connected to and supported by a panel which is connected to the frame.

11. The vehicle of claim 1, further comprising a left wind deflector and a right wind deflector connected to a left side and a right side, respectively, of the storage compartment.

12. The vehicle of claim 11, wherein a lower edge of the windshield is lower than an upper edge of the left wind deflector and an upper edge of the right wind deflector; and a lower edge of the left wind deflector and a lower edge of the right wind deflector windshield is lower than a lower edge of the windshield.

13. The vehicle of claim 1, wherein:
the vehicle is an all-terrain vehicle;
the driver seat is a straddle-type seat; and
the vehicle comprises:
a motor supported by the frame; and
four wheels connected to the frame, at least two of the four wheels being operatively connected to and driven by the motor.

14. A method of mounting a windshield to a vehicle, the method comprising:
selecting a windshield support from a first windshield support and a second windshield support, the second windshield support being taller than the first windshield support;

connecting the selected windshield support to a frame of the vehicle at a position forward of a driver seat of the vehicle and between a handlebar of the vehicle and a front storage rack of the vehicle;

connecting the windshield to the selected windshield support.

15. The method of claim 14, wherein:

connecting the windshield to the selected windshield support comprises:

inserting a pair of fasteners through one of a first pair of windshield apertures and a second pair of windshield apertures defined in the windshield; and inserting the pair of fasteners in a pair of windshield support apertures defined in the selected windshield support;

the windshield is at a first height relative to the frame when the pair of fasteners is inserted through the first pair of windshield apertures;

the windshield is at a second height relative to the frame when the pair of fasteners is inserted through the second pair of windshield apertures; and the second height is greater than the first height.

\* \* \* \* \*